United States Patent [19]

Eastin

[11] 4,126,607

[45] Nov. 21, 1978

[54] CASEIN DERIVATIVES AND METHOD OF PRODUCING THE SAME

[75] Inventor: William C. Eastin, Sebastopol, Calif.

[73] Assignee: Chelsea Industries, Inc., Boston, Mass.

[21] Appl. No.: 433,007

[22] Filed: Jan. 14, 1974

Related U.S. Application Data

[63] Continuation-in-part of Ser. No. 327,726, Jan. 29, 1973, abandoned, which is a continuation of Ser. No. 49,517, Jun. 24, 1970, abandoned.

[51] Int. Cl.$^2$ .............................. A23J 1/20; A23J 1/22
[52] U.S. Cl. ................................... 260/119; 106/146; 426/564; 426/573; 426/580
[58] Field of Search ........................ 106/146; 260/119

[56] References Cited

U.S. PATENT DOCUMENTS

| | | | |
|---|---|---|---|
| 183,024 | 10/1876 | Ross et al. ............................. 260/119 |
| 1,506,081 | 8/1924 | Regnier ................................. 260/119 |
| 1,604,309 | 10/1926 | Prestholdt ......................... 106/146 X |
| 1,604,310 | 10/1926 | Prestholdt ......................... 106/146 X |
| 1,777,161 | 9/1930 | Biddle ............................... 106/146 X |
| 1,814,768 | 7/1931 | Rippey et al. ......................... 106/146 |
| 1,886,750 | 11/1932 | Shisler ................................. 106/146 |
| 2,064,387 | 12/1936 | Schwartz .......................... 106/146 X |
| 2,182,357 | 12/1939 | Schwartz ..................... 260/119 UX |
| 2,266,736 | 12/1941 | Bradshaw ............................ 106/146 |

OTHER PUBLICATIONS

Chem. Abstracts, vol. 45, 1951, 421d–421f, Higgins et al.

*Primary Examiner*—Howard E. Schain
*Attorney, Agent, or Firm*—Naylor, Neal & Uilkema

[57] ABSTRACT

Calcium phospho-caseinates produced by the addition of 1.0 to 3.0% of one of the edible di- or tri-basic salts of phosphoric acid, or any of the complex dehydration products of these salts, to a slurry of casein and water, and neutralization with calcium hydroxide.

1 Claim, No Drawings

CASEIN DERIVATIVES AND METHOD OF PRODUCING THE SAME

RELATED APPLICATIONS

This application is a continuation-in-part of my co-pending application for "Casein Derivatives and Method of Producing the Same", Ser. No. 327,726, filed Jan. 29, 1973, now abandoned which in turn was a continuation of my co-pending application for "Casein Derivatives and Method of Producing the Same", Ser. No. 49,517, filed June 24, 1970, now abandoned.

Among the objects and advantages of the invention are the following: To obtain casein derivatives which are considerably easier to wet out and disperse in water than either calcium or sodium caseinate as commonly made; to obtain such derivatives over an extremely wide range of inherent solution viscosities, i.e. from solid gels at room temperature to quite thin colloidal suspensions measured at a 15% concentration; to obtain casein derivatives which do not have the slippery mouth feel and texture characteristics of sodium caseinate of the chalky texture of calcium caseinates; to obtain high viscosity casein derivatives having a very large temperature coefficient of viscosity; and to obtain low viscosity casein derivatives which form stable colloidal suspensions which do not settle out and which can be strongly heated without coagulation.

With respect to the foregoing objects and advantages, the high viscosity products may be, for example, 15% suspensions having a viscosity of 40 centipoise at 50° C. which upon cooling to 25° C. become solid gels with viscosities of over 40,000 centipoise, while the low viscosity products may, for example, at 15% solids and 25° C. have a viscosity which is 10–15 centipoise, or only slightly lower than that for calcium caseinate. Calcium caseinate suspensions, however, tend to settle out and cannot be heated at 190° F. without coagulation.

These and other objects and advantages of the invention are obtained by the addition of 1.0 to 3.0% of one of the edible di- or tri-basic salts of phosphoric acid, or any of the complex dehydration products of these salts, to a slurry of casein and water, and neutralization with calcium hydroxide. Trisodium phosphate is somewhat preferred; sodium tripoly phosphate, tripotassium phosphate, sodium pyrophosphate and sodium hexametaphosphate work about as well as trisodium phosphate; disodium phosphate and dipotassium phosphate work but they appear to form slightly weaker gels and when they are used about 10% more calcium hydroxide is required to neutralize to a given pH; monosodium phosphate and monopotassium phosphate do not work at all, there being no gel formation or increase in viscosity and there being required about 30% more calcium hydroxide to reach a given pH.

To produce a low viscosity casein derivative of the invention, about 1% of trisodium phosphate is added, neutralization is stopped at a pH slightly under 7.0, and a partial enzymatic hydrolysis is carried out by addition of a suitable proteolytic enzyme such as rennet or one of the fungal enzymes.

Uses for low viscosity casein derivatives of the invention include the following:

The fortification of breakfast cereals with protein. This application or use is based upon the fact that the low viscosity calcium phospho-caseinate is highly insoluble, has a very low flavor level, does not exhibit the slippery mouth feel of caseinate when wetted with milk, and does not cause the cereal to become rapidly soggy in the milk additive;

The potential production of imitation milk by the fortification of simulated vegetable fat liquid whole milk with protein, this application or use being based upon the low viscosity, the ability to stand pasteurization temperatures, the high calcium content and the stability of the colloidal suspension formed.

To produce a high viscosity casein derivative of the invention, a maximum viscosity is obtained under conditions where about 2.25% trisodium phosphate is added to a slurry of casein and water, and where calcium hydroxide is added to a pH slightly over 7.0, i.e. 7.2 to 7.6, no enzymatic treatment being used.

Uses for the high viscosity casein derivatives of the invention include the following:

An excellent high protein pudding may be formulated from a mixture of high viscosity calcium phospho-caseinate, sugar and cocoa. This mix is stirred into either cold or slightly warmed whole milk and refrigerated to cause it to set in about one hour to a pudding having a protein content of about 10% and a very fine texture;

A mix comprised of high viscosity calcium phospho-caseinate and liquid skim milk may be made to form a very palatable dietetic pudding having a protein content of about 13%;

A liquid mix containing sugar, milk, high viscosity calcium phospho-caseinate and flavoring may also be canned and retorted to make a sterile and palatable pudding.

A whipped topping having good body and texture may be made from the high viscosity calcium phospho-caseinate, sugar and flavoring, whipped with either cold water or skim milk.

EXAMPLES:

Example 1

A slurry of acid casein was made by suspending 140 lb. of casein in 100 gallons of water at 110° F. After 15 minutes, 3.25 lbs. of trisodium phosphate dissolved in 2 gallons of water was added, followed in about 5 minutes with 4.0 lbs. of calcium hydroxide. The mixture was then heated to 160° F. and spray dried to produce a powdered product. A 12% solution of the product in water has a viscosity of 97 centipoise at 48° C. and is a solid gel at 30° C. At 15% solids it is a solid gel at 50° C. It has the following analysis:

| % Moisture | 5.6 |
|---|---|
| % Protein ($H_2O$ Free) | 91.0 |
| % Calcium | 1.54 |
| % Ash ($H_2O$ Free) | 6.49 |
| pH (5% soln.) | 7.6 |

Example 2

A slurry of acid casein was made by suspending 210 lbs. of casein in 110 gallons of water at 115° F. Fourteen grams of Rohzyme P-53 were added, then 2.25 lbs. of trisodium phosphate were added, followed immediately by 5⅓ lbs of calcium hydroxide. The mix was heated to 180° F., requiring 30 minutes. It was held for 10 minutes at 180° F., cooled to 160° F., and spray dried to a powdered product. A 15% solution of the product in water has a viscosity of 7 centipoise at 48° C. and 13 centipoise at 20° C. It has the following analysis:

| | |
|---|---|
| % Moisture | 3.8 |
| % Protein (H₂O Free) | 92.7 |
| % Calcium | 1.23 |
| % Ash (H₂O Free) | 4.62 |
| pH (5% soln.) | 6.9 |

Example 3

An instant pudding mix was formulated from the product of Example 1:

| | |
|---|---|
| Calcium Phospho-Caseinate (Example 1) | - 105 g. |
| Granulated Sugar | - 175 g. |
| Dutch Process Cocoa | - 25 g. |

The above mix was stirred into 1 quart of homogenized whole milk at 115° F. and refrigerated for 1 hour to form a pudding with an excellent smooth texture. The mix will also work using cold milk with only a slight adverse effect upon texture.

Example 4

An instant dietary pudding mix was formulated from the product of Example 1:

| | |
|---|---|
| Product of Example 1 | 105 g. |
| Sucaryl | 15 g. |
| Vanilla Extract | 10 g. |

The calcium phospho-caseinate was stirred into 1 quart of warm skim milk containing the sucaryl and vanilla. After 1 hour of refrigeration, a very palatable pudding was formed.

That unique, specific compounds are being formed by the addition of phosphates is illustrated by the following data taken from a series of small laboratory batches varying the amount of trisodium phosphate and neutralizing with calcium hydroxide to a constant pH. The reagents were added to a suspension of casein in water, trisodium phosphate first, followed by the Ca(OH)₂. The viscosity of the resulting 15% suspension was then determined at several different temperatures.

| % Na₃PO₄ (casein basis) | % Ca(OH)₂ (casein basis) | pH (15% soln.) | Viscosity in Centipoise | | | | |
|---|---|---|---|---|---|---|---|
| | | | 50° C | 40° C | 35° C | 30° C | 25° C |
| 0 | 2.85 | 7.3 | 6 | 9 | 11 | 13 | 19 |
| 1.19 | 2.85 | 7.3 | 81 | 322 | 3068 | 29000 | Gel |
| 1.78 | 2.85 | 7.3 | 757 | Gel | | | |
| 2.38 | 2.85 | 7.3 | Gel | | | | |
| 2.98 | 2.62 | 7.3 | 1490 | 14625 | Gel | | |
| 3.57 | 2.38 | 7.3 | 104 | 169 | 325 | 617 | 2281 |

The amount of calcium hydroxide required to attain a pH of 7.3 remained constant at 2.85% of the casein, while the amount of trisodium phosphate added varied from 0 to 2.38%. Trisodium phosphate is a common neutralizing agent, sometimes used in the manufacture of sodium caseinate, and yet under these conditions it does not act as a neutralizing agent at all. The above data indicate that it is completely used up in the formation of a double salt with calcium until about 2.4% has been added. At this point it becomes present in excess and can once again function as a neutralizing agent. This point coincides with the development of maximum viscosity in the mixture. As more trisodium phosphate is added, the viscosity decreases, and at a level of 3.5% it is about the same as with common sodium caseinate and no gellation occurs.

Separate addition of the trisodium phosphate and calcium hydroxide to the casein slurry is important but their order of addition is not. Maximum viscosity is developed if either trisodium phosphate or calcium hydroxide is added separately and allowed to react before addition of the other reagent. If the trisodium phosphate and lime are mixed prior to addition there is no viscosity development and the pH is much lower for a given amount of neutralizer than if they are added separately (i.e. 6.4 vs. 7.3) even when the mixture is held overnight.

The effect of pH on the development of viscosity is demonstrated by data obtained on laboratory batches containing 2.38% trisodium phosphate and varying the amount of calcium hydroxide to obtain a series of pH values in the 15% solution:

| % Ca(OH)₂ | pH | Viscosity in Centipoise | | | |
|---|---|---|---|---|---|
| | | 50° C | 40° C | 30° C | 25° C |
| 2.85 | 7.3 | Gel | | | |
| 2.38 | 7.0 | 2340 | Gel | | |
| 1.90 | 6.6 | 108 | 266 | 754 | 1940 |

My invention is not limited to the addition of phosphate prior to the addition of calcium hydroxide. As indicated above, the order of addition is not important to the final product characteristics.

I have made products in the laboratory and in large scale manufacturing where the calcium hydroxide was added first, with no difference being apparent in the product formed. In detail the following was done:

1. 42 Grams of casein were added to 200 ml of water and after 15 minutes 1.2 grams of calcium hydroxide were added. After 5 minutes 1.0 grams of trisodium phosphate were added and the mixture heated to 160° F. The resulting product was the usual gel at 15% solids and 50° C., with a very smooth texture characteristic of the product formed when the phosphate was added first. It had a pH of 7.3.

2. The low viscosity product was made on a large scale. 1570 lb. of casein were suspended in 850 gallons of water at 100° F. 31 lb. of calcium hydroxide were added, followed in about 5 minutes by the addition of 18 lb. of trisodium phosphate. 67 grams of Rohzyme P-53 were added and the mix was heated to 180° F. It was held at 180° F. for 10 minutes, cooled to 160° F., and spray dried to a powdered product. A water suspension of the powder had a pH of 6.9, formed a colloidal dispersion which was completely stable to heat and had the lack of chalky texture and low viscosity typical of calcium phospho-caseinate produced when the order of addition of phosphate and lime was reversed.

What is claimed is:

1. Edible calcium phospho-caseinates produced by the method consisting essentially of the steps of forming a slurry of casein in water by mixing about one part of casein in from about four to about six parts of water, separately adding thereto from about 1 to about 3% by weight, based upon the weight of the casein, of a member of the group consisting of the edible di-basic sodium and potassium salts of phosphoric acid, the edible tribasic sodium and potassium salts of phosphoric acid, and the edible complex dehydration products of said salts, and an amount of calcium hydroxide to bring the pH of the mixture to 6.5–7.5, and heating and spray drying the mixture.

* * * * *